United States Patent [19]

Eguchi et al.

[11] Patent Number: 5,346,366
[45] Date of Patent: Sep. 13, 1994

[54] BLADED ROTOR AND APPARATUS FOR PRODUCING SAME

[75] Inventors: Shinsuke Eguchi; Masayuki Suzuki; Tetsuo Fukuoka, all of Atsugi, Japan

[73] Assignee: Nissan Motor Co., Ltd., Yokohama, Japan

[21] Appl. No.: 70,662

[22] Filed: Jun. 2, 1993

[30] Foreign Application Priority Data

Jun. 12, 1992 [JP] Japan .................. 4-179037

[51] Int. Cl.⁵ .................... F01D 5/22; F01D 33/18; B23P 15/00
[52] U.S. Cl. .................... 416/180; 416/197 C; 29/889.21; 29/899.5; 72/413; 72/473
[58] Field of Search ............. 416/180, 197 C; 60/330, 60/367; 29/889.5, 889.21; 72/413, 473

[56] References Cited

U.S. PATENT DOCUMENTS

| 2,474,298 | 6/1949 | Zeidler ................. | 416/180 |
| 2,745,354 | 5/1956 | English et al. ........ | 416/180 |
| 2,890,661 | 6/1959 | Egbert .................. | 416/180 |
| 3,316,622 | 5/1967 | Jandesek .............. | 416/197 C |
| 3,545,883 | 12/1970 | Iijima .................. | 416/180 |
| 4,133,091 | 1/1979 | Ito ....................... | 29/889.21 |

FOREIGN PATENT DOCUMENTS

| 51-92965 | 8/1976 | Japan . | |
| 91931 | 6/1983 | Japan .................. | 60/330 |
| 63-74228 | 5/1988 | Japan . | |

*Primary Examiner*—Edward K. Look
*Assistant Examiner*—James A. Larson
*Attorney, Agent, or Firm*—Foley & Lardner

[57] ABSTRACT

In a bladed rotor of the kind in which each blade has curved side surfaces and having fingers fitted in depressions of a shell and an opening of a core, the depressions of the shell and the opening of the core for receiving therein corresponding fingers of the blades are shaped and arranged so as to have, with respect to an elevational view of the rotor, longitudinal axes which coincide with straight lines extending radially through the center of the rotor, respectively. A die assembly for forming such depressions or openings in the shell or core is also provided. In such a die assembly, first and second die sections are adjustable in relative circumferential position for thereby adjusting the relative circumferential position relationship between the first and second groups of depressions or openings in the shell or core to be produced.

13 Claims, 7 Drawing Sheets

BLADED ROTOR AND APPARATUS FOR PRODUCING SAME

BACKGROUND OF THE INVENTION

1. Field of the Invention

The present invention relates to a bladed rotor such as an impeller of a torque converter and an apparatus for producing such a bladed rotor.

2. Description of the Prior Art

An example of a prior art bladed rotor is disclosed in Japanese Patent Provisional Publication No. 51-92965. The rotor consists of a shell, a core and a plurality of blades connected to the shell and core. The connection of the blades to the shell is attained by fitting the fingers of the blades which are provided to the shell engaged edge thereof, in the narrow, elongated depressions of the shell. Further, the connection of the blades to the core is attained by fitting the fingers of the blades which are provided to the core engaged edge thereof, in the slits of the core. The depressions of the shell and the slits of the core are constructed and arranged so as to be formable by punches and dies through relative movements thereof in parallel to the axis of rotation of the bladed rotor so that the forming of the depressions of the shell and the slits of the core as well as the installation of the blades to the shell and the core can be attained with ease.

However, in such a prior art bladed rotor of the kind in which each of its blades has flatly curved side surfaces, the depressions and the slits provided to the shell and the core are arranged so as to have, with respect to a plan view, longitudinal axes which do not coincide with the straight lines extending radially through the centers of the shell and the core but make certain angles therewith. Due to this, the punches for forming such depressions and slits have a difficulty in uniformly pushing the surfaces of the shell and the core against the dies but are subjected to bending forces, thus being liable to be broken easily and therefore shortening the lives of the die assemblies for forming such depressions and slits. Further, it is difficult to give sharp corners to such depressions due to irregular contact of the punches to the surface of the shell, thus causing a poor holding ability with which the blades are held by the depressions.

SUMMARY OF THE INVENTION

According to an aspect of the present invention, there is provided a novel and improved bladed rotor which comprises a shell, a core and a plurality of blades disposed between the shell and the core. Each of the blades having curved side surfaces and having at a shell engaged edge thereof two fingers fitted in slots formed in the shell and at a core engaged edge thereof a finger fitted in a slot formed in the core. The slots of the shell and the core are shaped and arranged so as to have, with respect to an elevational view of the rotor, longitudinal axes which coincide with straight lines extending radially through the center of the rotor, respectively.

According to another aspect of the present invention, the slots of the shell and the core are shaped and arranged so as to be formable by punches and dies through relative movements thereof in parallel to the axis of rotation of the rotor.

According to a further aspect of the present invention, the fingers of the blades are shaped and arranged so as to be, in installation thereof to the shell and the core, engageable with the slots of the shell and the core through movements of the blades relative to the shell and the core in parallel to the axis of rotation of the rotor.

According to a further aspect of the present invention, there is provided a die assembly for forming slots in a shell or core of such a bladed rotor. The die assembly comprises a first die section for forming a first group of the slots which are arranged in a first circular array concentric with the shell or core and a second die section for forming a second group of the depressions which are arranged in a second circular array concentric with the shell or core. The first and second die sections are adjustable in relative circumferential position relationship for producing various shells or cores having different circumferential position relationships between the first and second groups of the slots.

The above rotor and die assembly are effective for solving the above noted problems inherent in the prior art rotor and die assembly.

It is accordingly an object of the present invention to provide a novel and improved bladed rotor which can reduce manufacturing and assembling expense.

It is a further object of the present invention to provide a novel and improved bladed rotor of the above described character which can lengthen the life of a die assembly used in manufacturing of the rotor.

It is a further object of the present invention to provide a novel and improved bladed rotor of the above described character which makes it possible to attain an improved holding ability with which a shell can hold blades in its depressions.

It is a further object of the present invention to provide a novel and improved bladed rotor of the above described character which enables easy automatic assemblage.

It is a further object of the present invention to provide a die assembly for forming depressions in a shell of a bladed rotor of the above described character which is adjustable to form variously arranged depressions for various kinds of blades.

DETAILED DESCRIPTION OF THE PREFERRED EMBODIMENT

Figure 1:
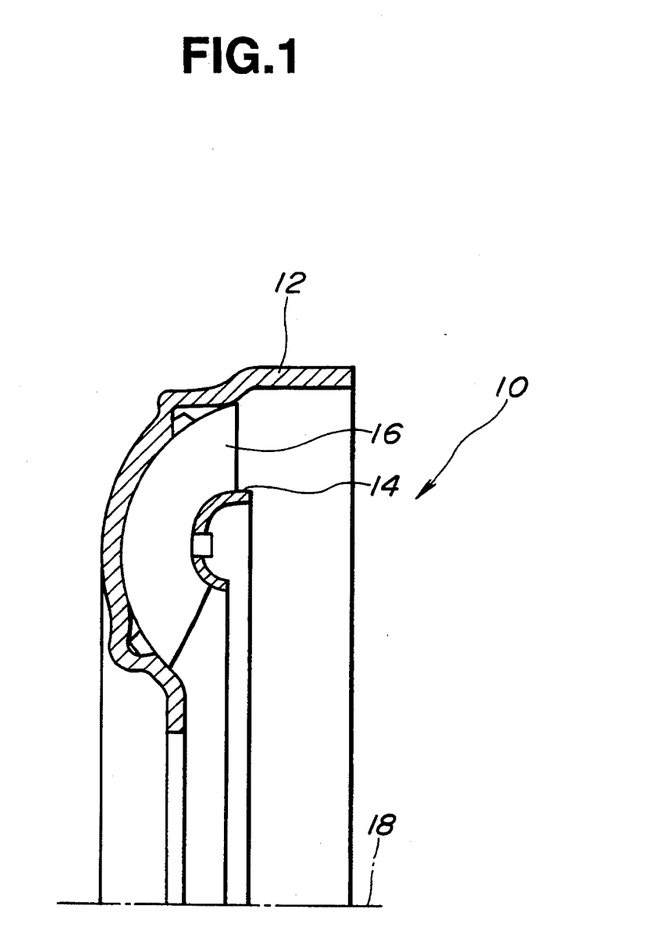
FIG. 1 is a fragmentary cross sectional view of a bladed rotor according to an embodiment of the present invention.

Referring first to FIG. 1, a bladed rotor according to an embodiment of the present invention is generally designated by 10 and consists of a shell 12, a core 14 and a plurality of blades 16.

Figure 2:
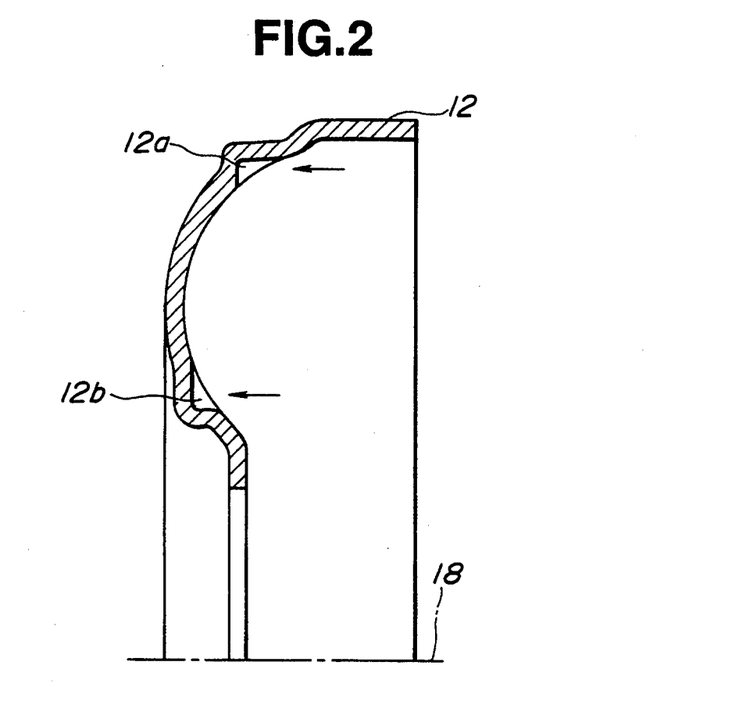
FIG. 2 is a fragmentary cross sectional view of a shell employed in the bladed rotor of FIG. 1.
Figure 3:
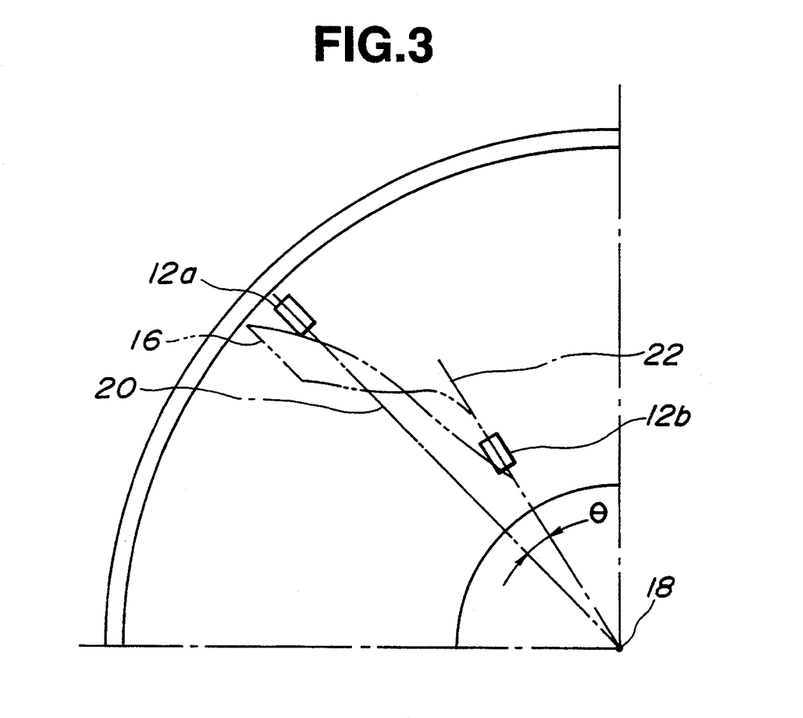
FIG. 3 is a fragmentary elevational view of the shell of FIG. 2.

As shown in FIG. 2, the shell 12 is in the form of an axially separated half of a vehicle wheel tire-like circular ring, i.e., a circular ring with a nearly circular cross section. The shell 12 has a set of two slots or narrow elongated depressions 12a and 12b. The depressions 12a and 12b are provided to the inner surface of a part-circular cross sectional portion of the shell 12. The depression 12a is positioned more radially outward than the depression 12b. Further, as shown in FIG. 3, the depressions 12a and 12b are shaped and arranged so as to have, with respect to an elevational view of the shell 12 or the rotor 10, longitudinal axes which are coincident with straight lines 20 and 22 extending radially through the center of the shell 12 or the rotor 10. That is, the depression 12a is narrow, rectangular and arranged so as to have a longitudinal axis that coincides with the radial line 20. The same occurs in case of the depression 12b. The radial lines 20 and 22 are spaced from each other by a predetermined angle $\theta$ which is determined depending upon the shape of the blade 16. In the meantime, though only one set of depressions 12a and 12b are shown for securing thereto one of the blades 16, plural sets of such depressions 12a and 12b are in effect provided for securing thereto the blades 16, respectively.

As shown in FIG. 2, the depressions 12a and 12b are shaped and arranged as to be formable by a punch (not shown) that moves in the direction indicated by the arrow heads, i.e., in parallel to the axis of rotation 18 of the shell 12 or rotor 10.

Figure 4:
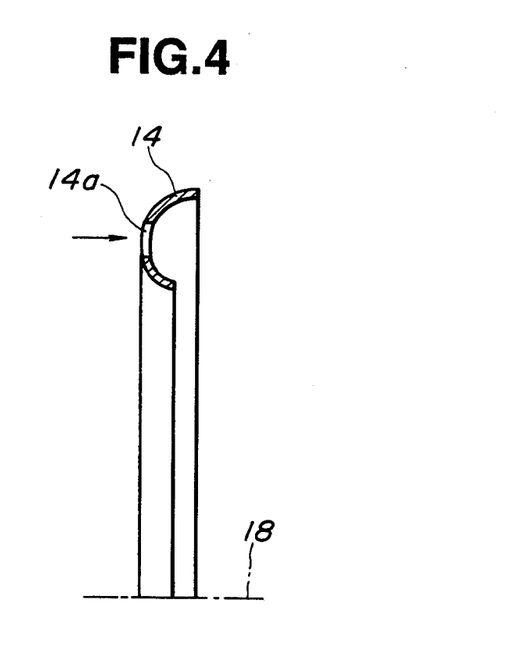
FIG. 4 is a fragmentary cross sectional view of a core employed in the bladed rotor of FIG. 1.
Figure 5:
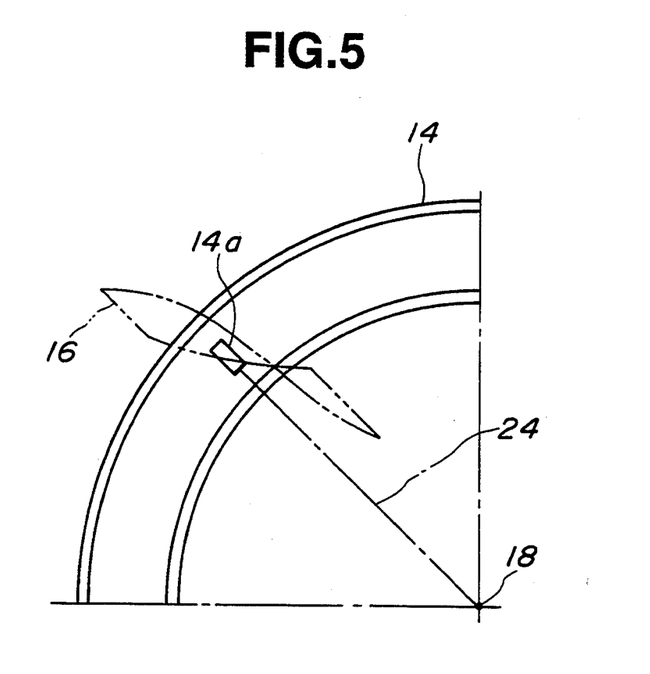
FIG. 5 is a fragmentary elevational view of the core of FIG. 4.

The core 14 is shown in FIGS. 4 and 5. As seen from FIG. 4, the core 12 is also in the form of an axially separated half of a circular ring having a part-circular cross section. The core 14 has a plurality of slits 14a for engagement with the blades 16 though only one is shown. The slit 14a is formed by a punch (not shown) that moves in the direction indicated by the arrow heads in FIG. 4, i.e., rightwardly and in parallel to the axis 18 of rotation of the core 14 or rotor The slit 14a, as shown in FIG. 5, is positioned on a radial line 24, i.e., the slit 14a has, with respect to an elevational view of the core 14 or the rotor 10, a longitudinal axis which coincides with a straight line 24 extending radially through the center of the core 14 or the rotor 10.

Figure 6:
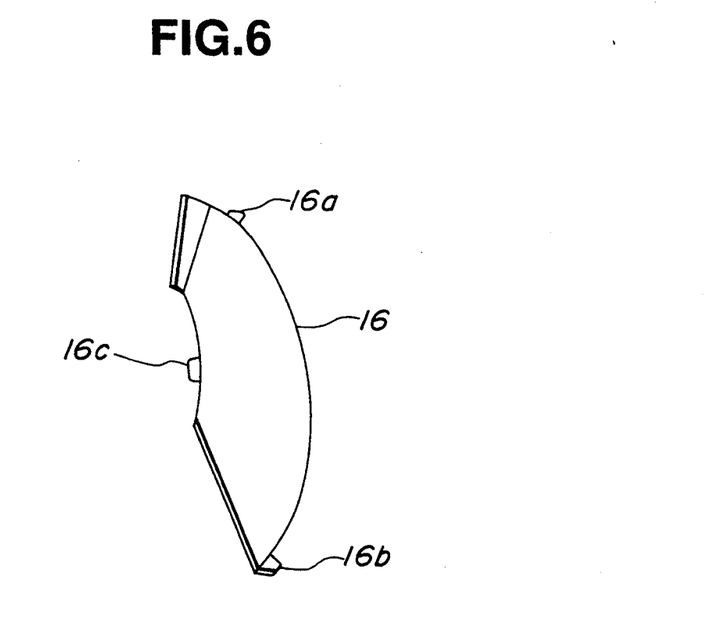
FIG. 6 is a side view of a blade employed in the bladed rotor of FIG. 1.
Figure 7:
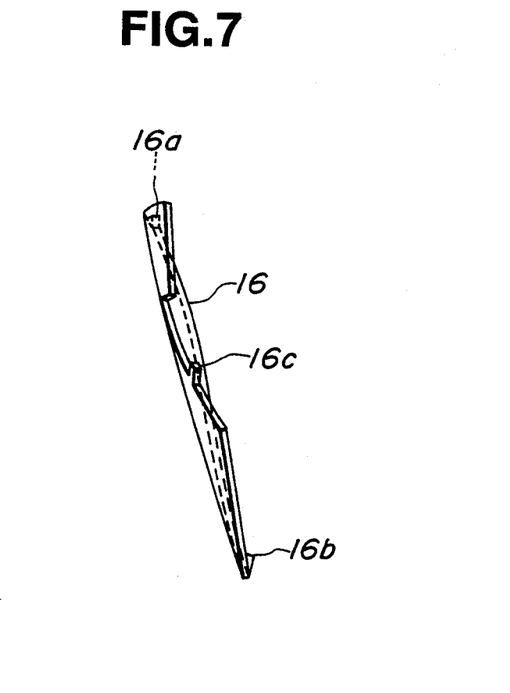
FIG. 7 is an elevational view of the blade of FIG. 6.

Each blade 16 has such a shape as shown in FIGS. 6 and 7. That is, the blade 16, with respect to the side view of FIG. 6, has a shell engaged edge that corresponds in profile to the inner periphery of the shell 12 and a core engaged edge that corresponds in profile to the inner periphery of the core 14. The blade 16 is provided with, at the shell engaged edge, two fingers 16a and 16b and at the core engaged edge, a finger 16c. The blade 16, as shown in FIG. 7, has gradually and flatly curved side surfaces but the fingers 16a and 16b are shaped and arranged so as to correspond in position and shape to the depressions 12a and 12b of the shell 12, respectively. The finger 16c is also shaped and arranged so as to correspond in position and shape to the slit 14a of the core 14. That is, the fingers 16a, 16b and 16c are shaped and arranged so as to have, with respect to an elevational view of the blade 16 or the rotor 10, longitudinal axes that coincide with the radial lines 20 and 22 of the shell 12 and the radial line 24 of the core 14, i.e., the straight lines extending radially through the center of the rotor 10, respectively.

In assembly of the bladed rotor 10, the blades 16 are firstly installed on the shell 12. That is, the fingers 16a and 16b of each blade 16 are fitted in the corresponding depressions 12a and 12b of the shell 12, respectively. In this instance, it is to be noted that the fingers 16a and 16b of the blade 16 and the depressions 12a and 12b of the shell 12 are shaped and arranged so as to be engageable with each other through relative movement thereof in parallel to the axis 18 of rotation of the bladed rotor 10 and are arranged so as to have, with respect to an elevational view of the shell 12 or the rotor 10, longitudinal axes which coincide with the straight lines extending radially through the center of the shell 12 or the rotor 10, so installation of the blades 16 to the shell 12 can be attained with ease. Accordingly, automatic assemblage of the blades 16 and the shell 12 by using an automatic assembling device can be attained with ease. Then, the core 14 is attached to the blades 16. That is, the core 14 can be joined with the blades 16 by pushing the core 14 toward the blades 16 while positioning the core 14 in such a manner as to coincide the slits 14a with the respective fingers 16c of the blades 16. In this case, for the same reason set forth above with respect to the assemblage of the shell 12 and the blades 16, automatic assembly using an automatic assembling device can be attained with ease. In the meantime, after assemblage of the core 14 and the blades 16, the blades 16c are bent by using a bending device for thereby completing the assemblage of the bladed rotor 10.

Figure 8:
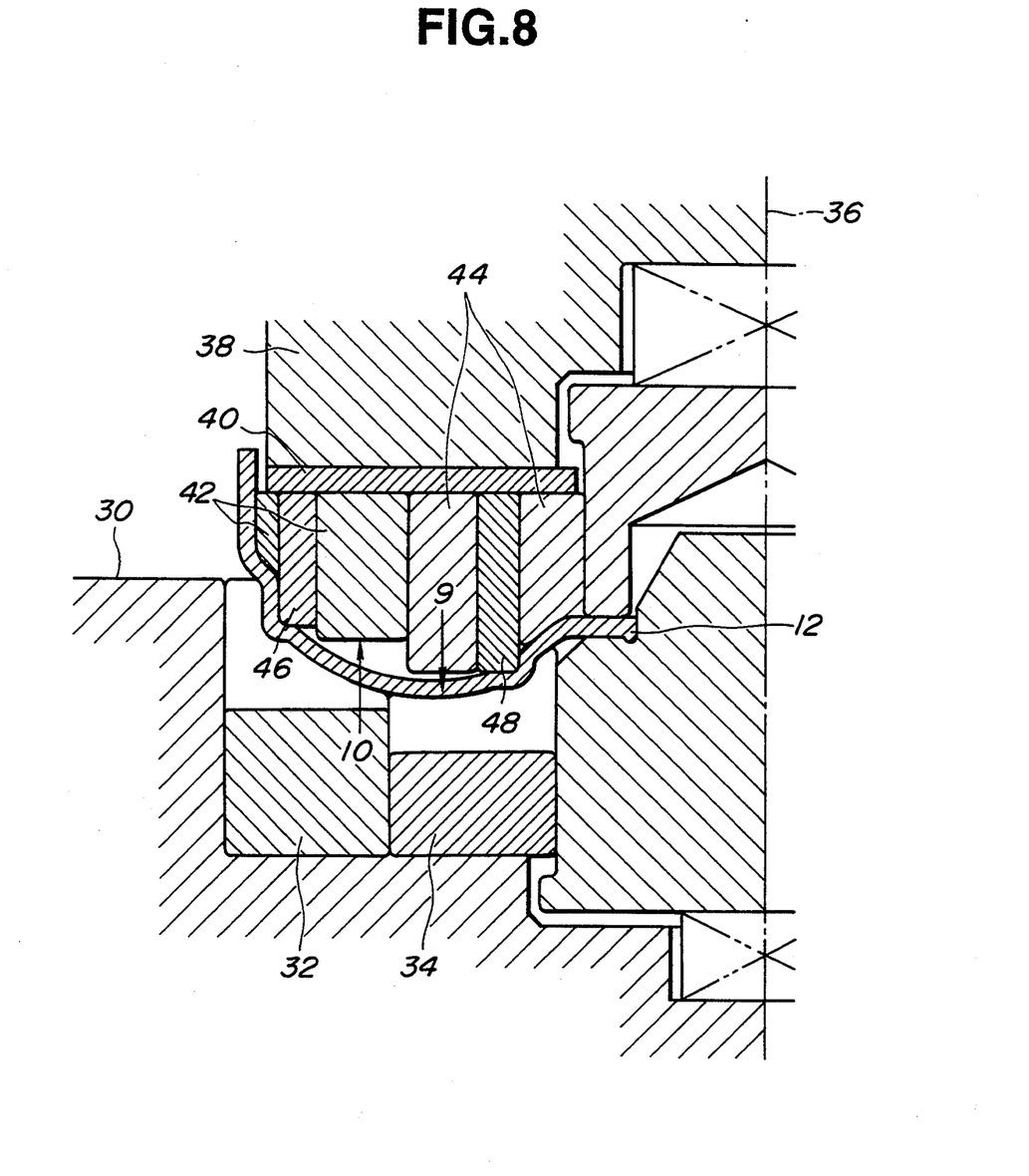
FIG. 8 is a fragmentary sectional view of a die assembly for forming depressions of the shell of FIG. 2.
Figure 9:
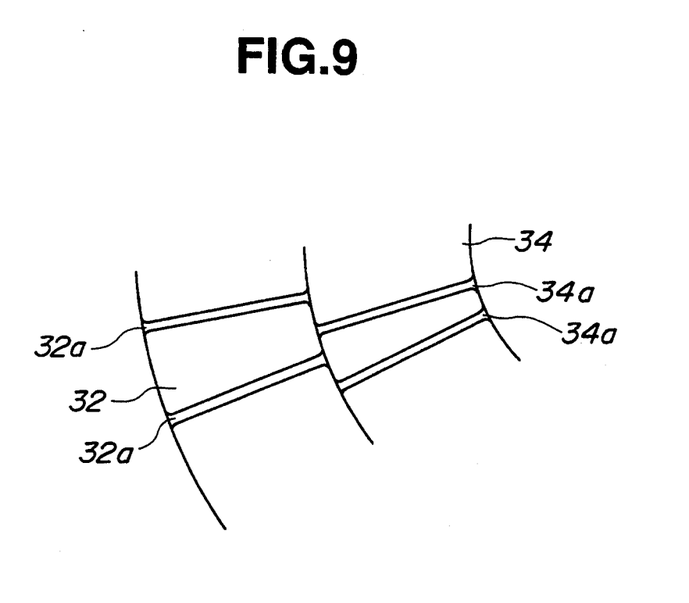
FIG. 9 is a view taken in the direction of the arrow "9" in FIG. 8.
Figure 10:
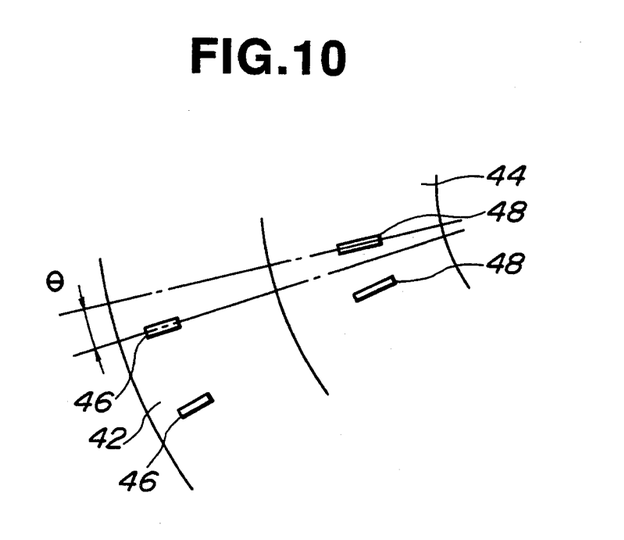
FIG. 10 is a view taken in the direction of the arrow "10" in FIG. 8.

Referring now to FIGS. 8 to 10, a die assembly for forming such depressions 12a and 12b by a press work will be described. As shown in FIG. 8, a lower die block 30 supports thereon dies 32 and 34. The die 32 is an annular member arranged concentric with a center 36 of the die assembly and formed with, as shown in FIG. 9, a plurality of radial grooves 32a arranged circumferentially with predetermined intervals. Further, the die 34 is an annular member disposed inside of the die 32 and formed with a plurality of radial grooves 34a arranged circumferentially with predetermined intervals. On the other hand, an upper die block 38 supports thereon by way of a plate 40, punch holders 42 and 44. The punch holder 42 supports thereon a plurality of punches 46 for forming the depressions 12a whilst the punch holder 44 supports thereon a plurality of punches 48 for forming the depressions 12b. The punch holder 42 is an annular member concentric with the center 36 of the die assembly. The punches 46, as shown in FIG. 10, are installed on the punch holder 42 in such a way as to be circumferentially spaced from each other with predetermined intervals. Similarly, the punch holder 44 is an annular member concentric with the center 36 of the die assembly. The punches 48 are installed on the punch holder 44 in such a way as to be circumferentially spaced from each other with predetermined intervals. The punches 46 and 48 are circumferentially spaced from each other by a predetermined angle $\theta$. The angle $\theta$ is adjustable by changing the relative circumferential position relationship between the punch holders 42 and 44.

In case of forming the depressions 12a and 12b in the shell 12 by a press work using the above described die assembly, the shell 12 is first placed on the dies 32 and 34, and then the upper die block 38 is let to go down for thereby pushing the punches 46 and 48 against the shell 12. By this, the shell 12 is formed with the depressions 12a and 12b.

In case of modification of the shape of the blade 16, the relative circumferential position relationship between the depressions 12a and 12b of the shell 12 needs to be changed. This can be attained by rotating the dies 32 and 34 a predetermined amount relative to each other, i.e., by changing the relative circumferential position relationship between the dies 32 and 34.

Figure 11A:
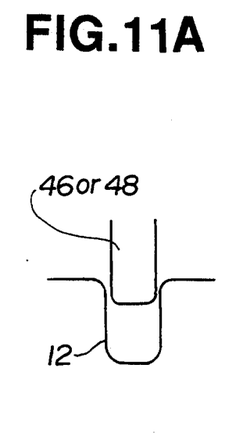
FIGS. 11A and 11B are schematic, cross sectional views of the depressions of the bladed rotor of FIG. 1 and a comparable prior art bladed rotor.
Figure 11B:
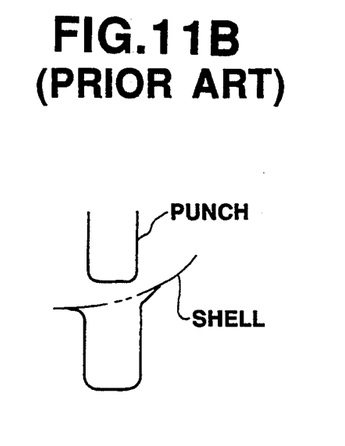

From the foregoing, it will be understood that according to the present invention the depressions of the shell and the slits of the core are shaped and arranged so as to elongate radially thereof, whereby the bending forces to which the punches are otherwise subjected can be eliminated or at least reduced, thus making it possible to lengthen the life of the punches and therefore the life of the die assembly considerably. In this connection, FIG. 11A shows a sectional view of the depression in the bladed rotor of this invention, whereas FIG. 11B is a similar view of the depression in a prior art bladed rotor. The sectional views are taken, in an elevational view similar to FIG. 3, along a line crossing a radial line of a rotor at right angles. From FIGS. 11A and 11B, it will be understood that the depression in the prior art rotor of this invention will cause a bending force directed circumferentially of the shell and applied to the corresponding punch during its forming, whereas the depression in the rotor of this invention will not cause such a bending force.

It will be further understood that according to the present invention it becomes possible for the depressions to have more sharp corners, thus making it possible to improve the holding ability with which the depressions hold the blades.

It will be further understood that according to the present invention the assembly of the blades and the shell or the core can be attained with an improved efficiency, and automatic assemblage thereof can be attained with ease.

It will be further understood that according to the present invention various shells for variously modified blades can be formed by the same die assembly, thus making it possible to reduce the manufacturing cost considerably.

Figure 12:
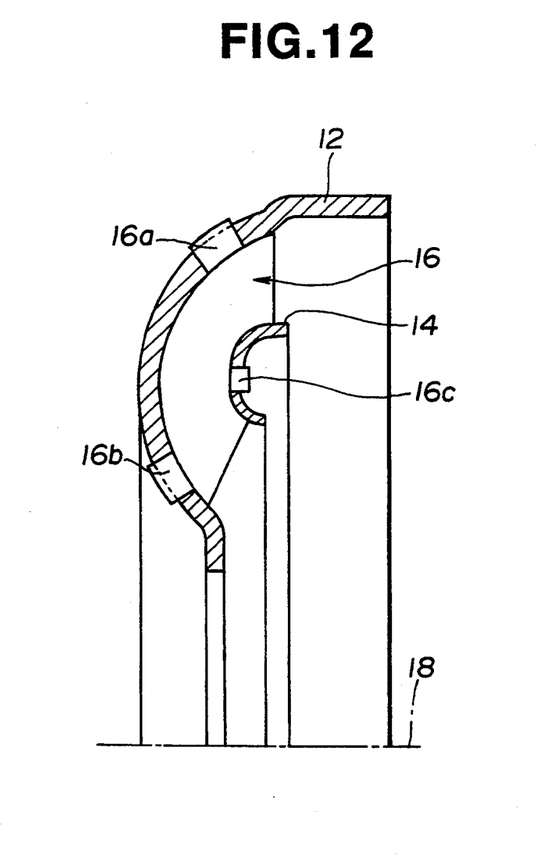
FIG. 12 is a view similar to FIG. 1 but shows a modification of the present invention.

While a preferred embodiment of a bladed rotor of this invention has been described and shown as above, it is not for the purpose of limitation but various modifications thereto may be made within the scope of this invention. For example, the depressions of the shell may be replaced by slits as shown in FIG. 12. Similarly, though not shown, the slits of the core may be replaced by depressions.

Figure 13:
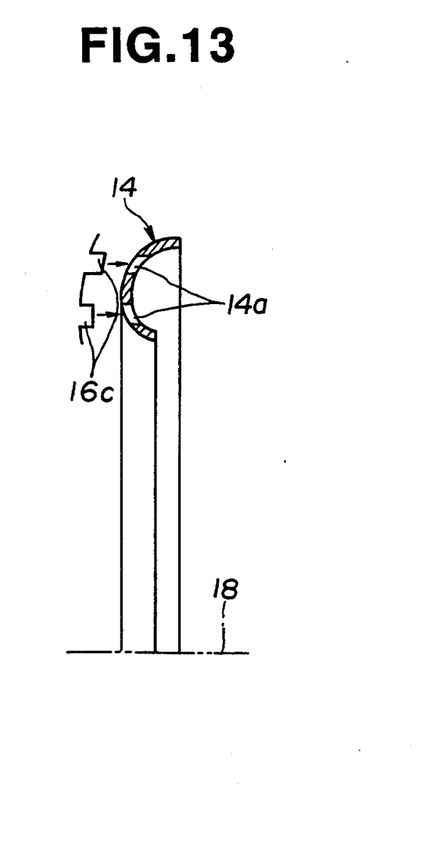
FIG. 13 is a view similar to FIG. 4 but shows another modification of the present invention.

Further, as shown in FIG. 13, the core 14 may otherwise be formed with a pair of slits 14a for receiving therein a corresponding pair of fingers 16c of a blade 16, which fingers are arranged similarly to those 16a and 16b for joining with the shell 12. In such a case, a die assembly similar to the die assembly of FIG. 8 can be used for forming such slits.

What is claimed is:

1. In a torque converter, a bladed rotor comprising a shell, a core and a plurality of blades disposed between the shell and the core, said shell being concentric with an axis of rotation of said rotor and in the form of an axially separated half of a circular ring with a nearly circular cross section, said core being concentric with the axis of rotation of said rotor and in the form of an axially separated half of a circular ring with a nearly circular cross section smaller than that of said shell, each of said blades being so shaped, with respect to a cross sectional view of said rotor, as to correspond in shape to a space between the shell and the core, each of said blades having curved side surfaces and having at a shell engaged edge thereof two fingers fitted in slots formed in said shell and at a core engaged edge thereof a finger fitted in a slot formed in said core, said shell engaged edge and said core engaged edge being curved with respect to an elevational view of said rotor so as to extend across a straight line extending radially through the center of said core;

said slots of said shell and said core being shaped and arranged so as to have, with respect to an elevational view of said rotor, longitudinal axes which coincide with straight lines extending radially through the center of said core, respectively;

said slots of said shell and said core being shaped and arranged so as to be formable by punches and dies through relative movement thereof in parallel to the axis of rotation of said rotor; and said fingers of said blades being shaped so as to be engageable with said slots of said shell and said core through relative movements of said shell and said blades in parallel to the axis of rotation of said rotor.

2. A bladed rotor according to claim 1, wherein said slots of said shell are depressions and said slot of said core is an opening.

3. A bladed rotor according to claim 1, wherein said slots of said shell and said core are openings.

4. A bladed rotor according to claim 1, wherein each of said blades has at said core engaged edge two said fingers fitted in two said slots, respectively.

5. A die assembly for forming the slots in the core of the bladed rotor according to claim 4, comprising a first die section for forming a first group of the slots which are arranged in a first circular array concentric with the core and a second die section for forming a second group of the slots which are arranged in a second circular array concentric with the core, said first and second die sections being adjustable in relative circumferential position relationship for producing various cores having different circumferential position relationships between the first and second groups of the slots.

6. A die assembly for forming the slots in the shell of the bladed rotor according to claim 1, comprising a first die section for forming a first group of the slots which are arranged in a first circular array concentric with the shell and a second die section for forming a second group of the slots which are arranged in a second circular array concentric with the shell, said first and second die sections being adjustable in relative circumferential position relationship for producing various shells having different circumferential position relationships between the first and second groups of the slots.

7. In a torque converter, a bladed rotor comprising a shell, a core and a plurality of blades disposed between the shell and the core, each of the blades having curved side surfaces and having at a shell engaged edge thereof two fingers fitted in slots formed in said shell and at a core engaged edge thereof a finger fitted in a slot formed in said core, said shell engaged edge and said core engaged edge being curved with respect to an elevational view of said rotor so as to extend across a straight line extending radially through the center of said core;

said slots of said shell and said core being shaped and arranged so as to have, with respect to an elevational view of said rotor, longitudinal axes which coincide with straight lines extending radially through the center of said core, respectively.

8. A bladed rotor according to claim 7, wherein said slots of said shell and said core are shaped and arranged so as to be formable by punches and dies through relative movement thereof in parallel to the axis of rotation of the rotor.

9. A bladed rotor according to claim 8, wherein said fingers of said blades are shaped and arranged so as to be, in installation thereof to said shell and said core, engageable with said slots of said shell and said core through movements of said blades relative to said shell and said core in parallel to the axis of rotation of the rotor.

10. A bladed rotor according to claim 7, wherein said slots of said shell are depressions and said slot of said core is an opening.

11. A bladed rotor according to claim 7, wherein said slots of said shell and said core are openings.

12. A die assembly for forming slots in a shell of a bladed rotor, the bladed rotor including the shell, a core and a plurality of blades disposed between the shell and the core, said shell being concentric with an axis of rotation of said rotor and in the form of an axially separated half of a circular ring with a nearly circular cross section, said core being concentric with the axis of rotation of said rotor and in the form of an axially separated half of a circular ring with a nearly circular cross section smaller than that of said shell, each of said blades being so shaped, with respect to a cross sectional view of said rotor, as to correspond in shape to a space between the shell and the core, each of said blades having at a shell engaged edge thereof two fingers fitted in the slots formed in said shell and at a core engaged edge thereof a finger fitted in a slot formed in said core;

said slots of said shell and said core being shaped and arranged so as to have, with respect to an elevational view of said rotor, longitudinal axes which coincide with straight lines extending radially through the center of said core, respectively;

said slots of said shell and said core being shaped and arranged so as to be formable by punches and dies through relative movement thereof in parallel to the axis of rotation of said rotor;

said fingers of said blades being shaped so as to be engageable with said slots of said shell and said core through relative movements of said shell and said blades in parallel to the axis of rotation of said rotor; and each of said blades being shaped to have curved side surfaces, said die assembly comprising:
a first die section for forming a first group of the slots which are arranged in a first circular array concentric with the shell; and
a second die section for forming a second group of the slots which are arranged in a second circular array concentric with the shell,
said first and second die sections being adjustable in relative circumferential position relationship for producing various shells having different circumferential position relationships between the first and second groups of the slots.

13. A die assembly for forming slots in a core of a bladed rotor, the bladed rotor including a shell, the core and a plurality of blades disposed between the shell and the core, said shell being concentric with an axis of rotation of said rotor and in the form of an axially separated half of a circular ring with a nearly circular cross section, said core being concentric with the axis of rotation of said rotor and in the form of an axially separated half of a circular ring with a nearly circular cross section smaller than that of said shell, each of said blades being so shaped, with respect to a cross sectional view of said rotor, as to correspond in shape to a space between the shell and the core, each of said blades having at a shell engaged edge thereof two fingers fitted in slots formed in said shell and at a core engaged edge thereof two fingers respectively fitted in two said slots formed in said core;

said slots of said shell and said core being shaped and arranged so as to have, with respect to an elevational view of said rotor, longitudinal axes which coincide with straight lines extending radially through the center of said core, respectively;

said slots of said shell and said core being shaped and arranged so as to be formable by punches and dies through relative movement thereof in parallel to the axis of rotation of said rotor;

said fingers of said blades being shaped so as to be engageable with said slots of said shell and said core through relative movements of said shell and said blades in parallel to the axis of rotation of said rotor; and each of said blades being shaped to have curved side surfaces, said die assembly comprising:
a first die section for forming a first group of the slots which are arranged in a first circular array concentric with the core; and
a second die section for forming a second group of the slots which are arranged in a second circular array concentric with the core,
said first and second die sections being adjustable in relative circumferential position relationship for producing various cores having different circumferential position relationships between the first and second groups of the slots.

* * * * *